United States Patent [19]

Davis et al.

[11] 3,962,094

[45] June 8, 1976

[54] HOLLOW FIBER SEPARATORY DEVICE

[75] Inventors: James C. Davis, Midland, Mich.; Robert C. Stevens, Miami, Fla.

[73] Assignee: The Dow Chemical Company, Midland, Mich.

[22] Filed: Sept. 4, 1975

[21] Appl. No.: 610,361

Related U.S. Application Data

[63] Continuation-in-part of Ser. No. 398,501, Sept. 18, 1973, abandoned, which is a continuation-in-part of Ser. No. 285,547, Aug. 31, 1972, abandoned.

[52] U.S. Cl. .................... 210/321 R; 210/321 A; 210/321 B
[51] Int. Cl.² ..................................... B01D 13/00
[58] Field of Search ............... 210/22, 321; 260/18

[56] References Cited
UNITED STATES PATENTS

| | | | |
|---|---|---|---|
| 3,362,921 | 1/1968 | Ehrlick | 260/18 |
| 3,643,805 | 2/1972 | Hoffman | 210/321 |
| 3,708,071 | 1/1973 | Crowley | 210/321 |

*Primary Examiner*—Frank A. Spear, Jr.
*Assistant Examiner*—Ferris H. Lander
*Attorney, Agent, or Firm*—Gary D. Street

[57] ABSTRACT

A separatory device is disclosed wherein a bundle of hollow fibers have their end portions potted in a polyurethane tube-sheet, said polyurethane consisting of an isocyanate-containing prepolymer which is non-catalytically crosslinked with a polyol. The resulting tube-sheet has demonstrated an unexpected degree of adherence to the fibers. In addition, essentially no adverse toxicity effects are encountered in biomedical applications of said device.

19 Claims, No Drawings

HOLLOW FIBER SEPARATORY DEVICE

CROSS REFERENCE TO RELATED APPLICATION

This application is a continuation-in-part of our copending application Ser. No. 398,501, filed Sept. 18, 1973, and now abandoned, which in turn is a continuation-in-part of application Serial No. 285,547, filed August 31, 1972 and now abandoned.

BACKGROUND OF THE INVENTION

Hollow fiber separatory devices useful for dialysis, ultra-filtration, reverse osmosis, hemodialysis, hemoultrafiltration, blood oxygenation and the like are well known. While various methods of manufacture have been described, in general the resulting separatory element consists of a plurality of fine hollow fibers whose end portions are potted in a tube-sheet and whose open fiber ends terminate in a tube-sheet face which provides liquid access to the interior of the fibers. The separatory elements are sealed within a casing to form a separatory cell having one or more liquid ports which allow for the passage of one fluid through the fibers and another around the fibers without mixing of the two fluids. The separatory element may have two tube-sheets or a single tube-sheet, in which latter case the fibers are doubled back so that all the ends terminate together. The general configuration of the separatory element and separatory cell is similar to a tube-and-shell heat exchanger.

Patents representative of the art of hollow fiber separatory devices include U.S. Pat. Nos. 2,972,349, 3,228,876, 3,228,877, 3,422,008, 3,423,491, 3,339,341, 3,503,515 and the like.

In order for a tube-sheet material to be useful, it should adhere well to the fibers and yet not deform them. Further, it must be easy to handle and must fabricate into a strong unit. And, of course, it must be non-toxic when used in biomedical applications.

The prior art has used a number of resins to form the tube-sheets. Typical of such resins are polyolefins, wax-extended polyolefins, polyolefin copolymers, polyamides, polystyrene, polyvinyl chloride, silicone rubbers, epoxy resins and the like. However, all the above resins have been found deficient in one aspect or another, and the art to date has not found a generally acceptable tube-sheet material, particularly regarding medical applications.

DESCRIPTION OF THE INVENTION

This invention relates broadly to hollow fiber separatory devices, and especially relates to a particular polyurethane material for forming an improved tube-sheet in such devices.

More particularly, the invention is in one embodiment a hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet comprising a cured polyurethane composition consisting essentially of:

A. A prepolymer which comprises the reaction product of castor oil with at least one mole per castor oil hydroxy group of an organic diisocyanate, and
B. A crosslinking agent comprising
  a. castor oil, or
  b. the ester of
     i. a polyhydric alcohol containing at least four hydroxy groups, and
     ii. an aliphatic acid of at least 12 carbon atoms and one or more hydroxy and/or epoxy groups per molecule, or mixtures of (a) and (b).

In another embodiment of the present invention, the tube-sheet composition of the hollow fiber separatory device is as set forth above except that the crosslinking agent comprises (b), i.e., the ester of
  i. a polyhydric alcohol containing at least four hydroxy groups, and
  ii. an aliphatic acid of at least 12 carbon atoms and one or more hydroxy and/or epoxy groups per molecule.

In still another similar embodiment, the crosslinking agent comprises the mixture of (a) and (b), i.e., castor oil and the ester of
  i. a polyhydric alcohol containing at least four hydroxy groups, and
  ii. an aliphatic acid of at least 12 carbon atoms and one or more hydroxy and/or epoxy groups per molecule.

The isocyanate prepolymer is generally prepared according to the method taught in U.S. Pat. No. 3,362,921, said method being the reaction of castor oil, or the like, with at least one mole of an organic diisocyanate for each castor oil hydroxyl group. This prepolymer, then, contains at least one free isocyanate group for each hydroxy group in the original castor oil, in addition to any excess diisocyanate originally added.

The organic diisocyanates useful in preparing the prepolymer are those generally known to react with castor oil, or the like. Arylene diisocyanates are preferred. Examples include toluene 2,4-diisocyanate, toluene 2,6-diisocyanate and their mixtures; m-phenylene diisocyanate; xenylene 4,4'-diisocyanate; naphthalene 1,5'-diisocyanate; 3,3'-bitolylene 4,4'-diisocyanate; diphenylene methane 4,4'-diisocyanate; and diphenylene ether 4,4'-diisocyanate. Also suitable are arylene diisocyanates with lower alkyl or alkoxy substituents. Toluene diisocyanates, diphenylene methane 4,4'-diisocyanate and m-phenylene diisocyanate are preferred, toluene diisocyanates being most preferred.

Commercial grades of castor oil are generally suitable herein for use in the prepolymer or the crosslinking agent components. Castor oil is a naturally occurring triglyceride or ricinoleic acid and thus contains at least three hydroxy groups. While the composition of castor oil cannot be precisely defined, it is generally accepted that its ester groups are usually 80–92% ricinoleic, 3–7% linoleic, 0–9% oleic and 0–1% palmitic.

Said prepolymer may also contain amounts of glycol and polyglycol monoesters of hydroxy carboxylic acids of at least 12 carbon atoms to the extent that said amount does not adversely effect the cured resin regarding undue water sensitivity. U.S. Pat. No. 3,362,921 discloses a number of said esters and their method of preparation. Preferred prepolymers include castor oil reacted with the aforesaid amounts of toluene diisocyanates, diphenylene methane 4,4'-diisocyanate or m-phenylene diisocyanate.

Useful curing or crosslinking agents include castor oil or esters of (1) polyhydric alcohols containing at least four hydroxy groups and (2) an aliphatic acid of at least 12 carbon atoms and one or more hydroxy and/or epoxy groups per molecule or mixtures of castor oil and said esters. Castor oil itself may also be utilized as the crosslinking agent with satisfactory results. Castor oil is preferred as a crosslinking agent where the organic diisocyanate is diphenylene methane 4,4'-diisocyanate. A preferred crosslinking agent comprises the esters of (1) polyhydric alcohols containing at least four hydroxy groups, and (2) an aliphatic acid of at least 12 carbon atoms and one or more hydroxy and/or epoxy groups per molecule. Another preferred crosslinking agent comprises mixtures of the foregoing esters with castor oil.

The aliphatic acid, which may be saturated or unsaturated, may be illustrated by the following: ricinoleic acid, 12-hydroxy stearic acid, hydroxy palmitic acid, hydroxy pentadecanoic acid, hydroxy myristic acid, hydroxy cerotic acid, as well as the epoxy derivatives of same. Ricinoleic acid is preferred.

Suitable polyhydric alcohols which contain at least four hydroxy groups include pentaerythritol, erythritol, arabitol, mannitol, sorbitol, sucrose, and the like. Pentaerythritol is preferred.

The esters which are useful for curing the prepolymers are prepared from the above acids and polyhydric alcohols, or mixtures thereof, by well known techniques, such as by direct esterification. Other processes may also be utilized. Examples include pentaerythritol monoricinoleate, pentaerythritol 12-hydroxy stearate, sorbitol monoricinoleate, erythritol monoricinoleate, and the like. Also contemplated are diesters, triesters and tetraesters of the above. Preferred esters include the mono- and di-esters of pentaerythritol and ricinoleic acid, and their mixtures.

Those preferred crosslinking agents having only aliphatic acid and polyhydric alcohol components are preferably employed in amounts of from about 35 to about 45 parts by weight per 100 parts of prepolymer. Larger amounts of crosslinking agent are ordinarily required when castor oil itself or castor oil and ester mixtures are employed as the crosslinking agent component.

In a preferred embodiment, from about 100 to about 140 parts by weight of castor oil or castor oil/ester mixtures are utilized for each 100 parts by weight of prepolymer.

The amount of crosslinking agent added to the prepolymer composition should be sufficient to react with the free isocyanate groups remaining after the preparation of the prepolymer, but preferably not too low or too large an excess is used. The low amounts may result in a cured system which is too hard while excess amounts may result in undesired plasticizer action. The proper amount of crosslinking agent required to react properly with the prepolymer can readily be determined by those skilled in the art by known calculations.

Fibers which are adaptable to the tube-sheet material taught herein are those which are made from compounds which include —OH, —NH$_2$ and —NH— groups, and include those which are made from cellulose, cellulose acetate, cellulose ethers, polyamides, polyacrylamides, polysulfones, polyesters, polycarbonates, polyurethanes, polysaccharides, and proteins in general, such as casein, collagen and the like. Preferred fibers include cellulose and cellulose acetate.

The tube-sheet may be formed in a number of ways well known to the art. A preferred method is by centrifugal casting according to U.S. Pat. No. 3,492,698.

Generally, hollow fibers are fabricated into a substantially parallel bundle of from about 1000 to 20,000 or more fibers by a number of methods. One such method is to wrap a fiber continuously end-to-end onto a mandrel rod with retaining brackets on either end. The substantially parallel fibers are then inserted into a holding device with end-molds as described in the afore-mentioned U.S. Pat. No. 3,492,698 relating to centrifugal casting.

The holding device containing the fiber bundle is then placed into a centrifuge-like device which incorporates a potting-material reservoir with tubes connecting it to the end-molds. The polyurethane resin (a toluene diisocyanate/castor oil-pentaerythritol monoricinoleate system for example) is mixed and placed into the potting reservoir wherein it is maintained at a temperature of from about 25°C. to about 90°C., preferably about 70°C., and the entire assembly then rotated to provide a 2 to 200 $g$ force nearly parallel to the fiber bundle. The resin is forced down the connecting tubes by the g force, and flows around and among the fibers in the end-molds. The process is continued until the reservoir is devoid of resin.

The rotation is continued until the polyurethane is gelled. At that point the bundle is removed and the unit placed in an oven for post curing. Twelve hours at 50°C. to about 1.5 hours at 100°C. is adequate, around 8 hours at 70°C. being preferred. Next, the end-molds are displaced and the potted fibers are opened by cutting through the tube-sheet perpendicular to the fiber bundle. A bundle results wherein the potted end or ends demonstrate structural integrity and round, open fibers.

Toxicity determinations were made as follows. In studying the toxicology of potting materials, it is essential that they be in the form in which they will be used. Therefore, all samples for toxicity study consisted of actual tube-sheet slices, the fibers being present in the normal amounts.

Initial toxicological studies were based on analytical techniques with no biological testing. These tests are those described in U.S. Pharmacopeia XVIII, p. 929–930, for blood-contacting plastics. These tests consist of extracting the sample with 70°C. water and analyzing the extract for non-volatile residues, heavy metals and titratable substances. In all cases the polyurethane used in this invention easily met specifications.

A series of tissue toxicity tests were also carried out essentially identical to those described in U.S. Pat. XVIII, p. 926. The tests consist of extracting the samples (tube-sheet slices) as above and injecting the extracts into animals. Another sample of the unextracted tube-sheet was implanted in the back muscle of a rabbit. Except for one undercured sample (i.e., 4 hours at 50°C.) which gave doubtful results only, all samples submitted passed this test.

SPECIFIC EMBODIMENTS

EXAMPLE 1

Three hollow fiber bundles were prepared from glycerine-plasticized cellulose fibers (250$\mu$ O.D. x 200$\mu$ I.D.) by potting about 1000 each of the above fibers in different tube-sheet materials. Each potted fiber bundle was then cured using recommended conditions for the tube-sheet material selected. The tube-sheets were then sliced at right angles to reveal the open ends of the fiber tows, which were about 13 inches long. Microscopic examination showed each bundle consisted of round, open lumens with no indication of fiber blockage.

Each bundle was then subjected to a wet leaching step to replace the glycerine plasticized with water. These bundles were then assembled into shells and tested for liquid (water) pressure drop through the fibers, as well as another microscopic examination of the lumens. The nature of the potting material, as well as the results, is given below.

a. Fiber bundle potted in an epoxy system of a bisphenol A-type liquid epoxy resin (DER 332, a product of The Dow Chemical Company) and a methylenedianiline hardener extended with dibutyl phthalate and catalyzed with salicylic acid —
   Pressure drop was greater than 400 mmHg at a flow rate of 50 cc./min.
   Half-moon shaped fibers appeared at various locations in the tube-sheet. This occurs as a result of poor tube-sheet adherence.

b. Fiber bundle potted in a styrene diluted, free radical initiated vinyl ester resin (DERAKANE resin, a product of The Dow Chemical Company) —
   Pressure drop was greater than 100 mmHg at a flow rate of 100 cc./min.
   Tube-sheet examination revealed that fibers had "grown" up to 3 mm. over the tube-sheet surface. This results from poor tube-sheet adherence during the wet leaching step.

c. Fiber bundle potted in a polyurethane comprising toluene diisocyanate/castor oil and pentaerythritol monoricinoleate (100 parts CONAP RN2000 to 37 parts CONACURE AH 10, both being products of Conap Corp.) —
   Pressure drop was about 50 mmHg at 100 cc./min., which is near theoretical (45 mmHg).
   The fiber ends remained round and unobstructed after wetting, indicating good adherence of tube-sheet to fibers during wet leaching step.

d. Fiber bundle potted in a polyurethane comprising 100 parts castor oil/diphenyl methane diisocyanate prepolymer (VORITE 689, available from NL Industries, Inc.) and 126 parts castor oil (DB OIL, available from NL Industries, Inc.) crosslinking agent —
   Pressure drop was about 50 mmHg at 100 cc./min., which is near theoretical (45 mmHg).
   The fiber ends remained round and unobstructed after wetting, indicating good adherence of tube-sheet to fibers during wet leaching step.

Good results were also obtained with 100 parts of VORITE 689 prepolymer and a cross-linking agent comprising the mixture of about 108 parts of DB OIL and about 12 parts of CONACURE AH 10 per 100 parts of prepolymer.

EXAMPLE 2

Bundles of about 1000 hollow cellulose acetate fibers were potted into the epoxy formulation of Example 1a above, and similar bundles into the polyurethane composition of Example 1c above. Quality control (both microscopic and performance) showed that significantly less leaks appeared in the polyurethane tube-sheets than with the epoxy. Microscopic examination revealed that many of the leaks with the epoxy tube-sheets occurred between the fiber and the tube-sheet. This indicates less adherence between fiber and tube-sheet than is true with the polyurethane disclosed herein. It would appear that the polyurethane adherence prevents the leaks experienced with other potting compounds, said leaks developing as a result of the shrinkage of cellulose acetate (about 1%) when the plasticizer is leached out.

We claim:

1. A hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet comprising a cured polyurethane composition consisting essentially of:
   A. A prepolymer which comprises the reaction product of castor oil with at least one mole per castor oil hydroxy group of an organic diisocyanate, and
   B. A crosslinking agent comprising
      a. castor oil or
      b. the ester of
         i. a polyhydric alcohol containing at least four hydroxy groups, and
         ii. an aliphatic acid of at least 12 carbon atoms and one or more hydroxy and/or epoxy groups per molecule,
   or mixtures of (a) and (b).

2. The device of claim 1 wherein the crosslinking agent is castor oil.

3. The device of claim 2 wherein the organic diisocyanate of the prepolymer is diphenylene methane 4,4'-diisocyanate.

4. The device of claim 1 wherein the crosslinking agent is the ester of
   i. a polyhydric alcohol containing at least four hydroxy groups, and
   ii. an aliphatic acid of at least 12 carbon atoms and one or more hydroxy and/or epoxy groups per molecule.

5. The device of claim 4 wherein the polyurethane composition consists essentially of:
   A. A prepolymer which comprises the reaction product of castor oil with at least one mole per castor oil hydroxy group of toluene 2,4-diisocyanate, toluene 2,6-diisocyanate or their mixtures, diphenylene methane 4,4'-diisocyanate, or m-phenylene diisocyanate, and
   B. A crosslinking agent comprising the ester and/or diester of pentaerythritol and ricinoleic acid.

6. The device of claim 1 wherein the crosslinking agent comprises a mixture of components (a) and (b).

7. The device of claim 6 wherein the organic diisocyanate is diphenylene methane 4,4'-diisocyanate and the crosslinking agent is a mixture of castor oil and the ester of pentaerythritol and ricinoleic acid.

8. The device of claim 5 wherein the polyurethane composition comprises 35 to 45 parts of component B to each 100 parts of component A.

9. The device of claim 1 wherein the polyurethane composition comprises from about 100 to about 140 parts by weight of castor oil or castor oil and ester crosslinking agent per 100 parts of prepolymer.

10. A hollow fiber separatory bundle for use in a separatory device comprising a plurality of hollow fibers made from a compound which includes —OH, —NH$_2$ or —NH— groups, the end portions of said fibers being potted in a cured polyurethane composition consisting essentially of:
   A. A prepolymer which comprises the reaction product of castor oil with at least one mole per castor oil hydroxy group of an organic diisocyanate, and
   B. A crosslinking agent comprising
      a. castor oil or
      b. the ester of
         i. a polyhydric alcohol containing at least four hydroxy groups, and
         ii. an aliphatic acid of at least 12 carbon atoms and one or more hydroxy and/or epoxy groups per molecule,
   or mixtures of (a) and (b).

11. The bundle of claim 10 wherein the hollow fibers are made from cellulose or cellulose acetate.

12. The device of claim 10 wherein the crosslinking agent is castor oil.

13. The device of claim 12 wherein the organic diisocyanate of the prepolymer is diphenylene methane 4,4'-diisocyanate.

14. The device of claim 10 wherein the crosslinking agent is the ester of
   i. a polyhydric alcohol containing at least four hydroxy groups, and
   ii. an aliphatic acid of at least 12 carbon atoms and one or more hydroxy and/or epoxy groups per molecule.

15. The device of claim 14 wherein the polyurethane composition consists essentially of:
   A. A prepolymer which comprises the reaction product of castor oil with at least one mole per castor oil hydroxy group of toluene 2,4-diisocyanate, toluene 2,6-diisocyanate or their mixtures, diphenylene methane 4,4'-diisocyanate, or m-pehnylene diisocyanate, and
   B. A crosslinking agent comprising the ester and/or diester of pentaerythritol and ricinoleic acid.

16. The device of claim 10 wherein the crosslinking agent comprises a mixture of components (a) and (b).

17. The device of claim 16 wherein the organic diisocyanate is diphenylene methane 4,4'-diisocyanate and the crosslinking agent is a mixture of castor oil and the ester of pentaerythritol and ricinoleic acid.

18. The device of claim 15 wherein the polyurethane composition comprises 35 to 45 parts of component B to each 100 parts of component A.

19. The device of claim 10 wherein the polyurethane composition comprises from about 100 to about 140 parts by weight of castor oil or castor oil and ester crosslinking agent per 100 parts of prepolymer.

* * * * *